(12) United States Patent
Shah et al.

(10) Patent No.: US 10,909,569 B1
(45) Date of Patent: Feb. 2, 2021

(54) OBTAINING A COMPOSITE PREDICTION INDICATING A LIKELIHOOD THAT A USER OF AN ONLINE SYSTEM WILL PERFORM A CONVERSION ASSOCIATED WITH A CONTENT ITEM VIA ONE OR MORE PATHS OF EVENTS

(71) Applicant: Facebook, Inc., Menlo Park, CA (US)

(72) Inventors: Nimish Rameshbhai Shah, Cupertino, CA (US); Zheng Chen, Mountain View, CA (US); Lixing Huang, Los Altos, CA (US); Yang Li, Sunnyvale, CA (US); Xin Liu, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 120 days.

(21) Appl. No.: 16/214,114

(22) Filed: Dec. 9, 2018

(51) Int. Cl.
  *G06Q 30/00* (2012.01)
  *G06Q 30/02* (2012.01)
  *G06F 16/901* (2019.01)
  *G06N 20/00* (2019.01)

(52) U.S. Cl.
  CPC ..... *G06Q 30/0246* (2013.01); *G06F 16/9027* (2019.01); *G06N 20/00* (2019.01)

(58) Field of Classification Search
  None
  See application file for complete search history.

(56) References Cited

U.S. PATENT DOCUMENTS

| | | | | |
|---|---|---|---|---|
| 5,999,912 | A * | 12/1999 | Wodarz | G06Q 30/02 705/14.61 |
| 6,260,047 | B1 * | 7/2001 | Fox | G06Q 10/087 700/106 |
| 2006/0015893 | A1 * | 1/2006 | Kitsukawa | G06Q 30/0225 725/23 |
| 2006/0031107 | A1 * | 2/2006 | Aihara | G06Q 40/06 705/7.28 |
| 2006/0206379 | A1 * | 9/2006 | Rosenberg | G06Q 30/02 705/14.54 |
| 2008/0040329 | A1 * | 2/2008 | Cussen | G06F 16/9535 |
| 2008/0052157 | A1 * | 2/2008 | Kadambi | G06Q 30/02 705/14.48 |

(Continued)

OTHER PUBLICATIONS

STIC EIC 3600 Search Report for application 16214114 dated Jul. 6, 2020. (Year: 2020).*

*Primary Examiner* — Matthew T Sittner
(74) *Attorney, Agent, or Firm* — Fenwick & West LLP (57) ABSTRACT

An online system obtains a composite prediction associated with a content item indicating a likelihood that a viewing user of the online system will perform a type of conversion associated with the content item via one or more paths of events leading to the type of conversion. The online system obtains the composite prediction based on a tree data structure describing the path(s) of events. Upon identifying an opportunity to present content to the viewing user, the online system identifies the tree data structure corresponding to the type of conversion from multiple tree data structures maintained in the online system and obtains a composite prediction associated with the content item by evaluating and performing operations associated with nodes of the tree data structure while traversing the nodes. The online system then determines whether to present the content item to the viewing user based on the composite prediction.

18 Claims, 3 Drawing Sheets

(56) References Cited

U.S. PATENT DOCUMENTS

| | | | |
|---|---|---|---|
| 2008/0103887 A1* | 5/2008 | Oldham | G06Q 30/0277 705/14.71 |
| 2008/0243756 A1* | 10/2008 | Moon | G06Q 30/0272 |
| 2010/0050098 A1* | 2/2010 | Turner | H04W 4/20 715/763 |
| 2011/0078718 A1* | 3/2011 | Jakobi | H04H 60/63 725/14 |
| 2012/0191529 A1* | 7/2012 | Lewis | G06Q 30/02 705/14.41 |
| 2013/0091019 A1* | 4/2013 | Mallon | G06Q 30/0251 705/14.68 |
| 2013/0110949 A1* | 5/2013 | Maurel | G06Q 30/02 709/206 |
| 2013/0254787 A1* | 9/2013 | Cox | H04N 21/4661 725/13 |
| 2013/0325633 A1* | 12/2013 | McAfee | G06Q 30/0277 705/14.68 |
| 2014/0129321 A1* | 5/2014 | Bruich | G06Q 30/0245 705/14.44 |
| 2014/0207793 A1* | 7/2014 | Liu | G06Q 30/0277 707/748 |
| 2014/0236728 A1* | 8/2014 | Wright | G06Q 30/0267 705/14.58 |
| 2014/0244386 A1* | 8/2014 | Mathur | G06Q 30/0255 705/14.53 |
| 2014/0279069 A1* | 9/2014 | Rubinstein | G06Q 30/0277 705/14.73 |
| 2014/0280105 A1* | 9/2014 | Resende | G06Q 50/01 707/725 |
| 2015/0112790 A1* | 4/2015 | Wolinsky | G06Q 20/32 705/14.38 |
| 2015/0127528 A1* | 5/2015 | Maksimow | G06Q 50/01 705/39 |
| 2015/0134460 A1* | 5/2015 | Tian | G06Q 30/0269 705/14.66 |
| 2015/0150035 A1* | 5/2015 | Chizi | H04N 21/812 725/14 |
| 2015/0317666 A1* | 11/2015 | Pygnasak | G06Q 30/0226 705/14.27 |
| 2015/0356613 A1* | 12/2015 | Fang | G06Q 30/0265 705/14.62 |
| 2016/0007093 A1* | 1/2016 | Liu | H04N 21/812 725/32 |
| 2016/0042385 A1* | 2/2016 | Blackhurst | G06Q 30/0246 705/14.41 |
| 2016/0134934 A1* | 5/2016 | Jared | G06Q 30/0203 725/14 |
| 2016/0292722 A1* | 10/2016 | Myers | G06Q 30/0247 |
| 2016/0350802 A1* | 12/2016 | Mehanian | G06Q 30/0254 |
| 2017/0024764 A1* | 1/2017 | Mooser | G06Q 30/0275 |
| 2017/0024770 A1* | 1/2017 | Abdulkader | G06Q 30/0277 |
| 2017/0024777 A1* | 1/2017 | Rajwat | G06Q 30/0275 |
| 2017/0178181 A1* | 6/2017 | Liu | G06Q 30/0275 |
| 2017/0193555 A1* | 7/2017 | Davis | H04L 67/10 |
| 2017/0228109 A1* | 8/2017 | Zhang | G06F 16/9577 |

* cited by examiner

OBTAINING A COMPOSITE PREDICTION INDICATING A LIKELIHOOD THAT A USER OF AN ONLINE SYSTEM WILL PERFORM A CONVERSION ASSOCIATED WITH A CONTENT ITEM VIA ONE OR MORE PATHS OF EVENTS

BACKGROUND

This disclosure relates generally to predicting a likelihood that a user of an online system will perform a conversion associated with a content item, and more specifically to obtaining a composite prediction indicating a likelihood that a user of an online system will perform a type of conversion associated with a content item via one or more paths of events.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

Content items may be associated with various types of conversions that may be performed by online system users to whom the content items are presented. For example, suppose that a content item is associated with a type of conversion corresponding to downloading an application associated with the content item. In this example, online system users who are presented with the content item may perform the type of conversion associated with the content item by downloading the application from a website that the users may access by clicking on the content item.

Conventionally, to maximize the number of conversions performed by online system users, online systems select content items for presentation to the users based on predicted likelihoods that the users will perform types of conversions associated with the content items. Online systems may predict these likelihoods based on information associated with the content items (e.g., targeting criteria, tags, etc.) and information associated with the users (e.g., user profile information, information describing actions performed by the users, etc.). For example, suppose that targeting criteria associated with a content item specifying user attributes associated with online system users who are likely to perform a conversion associated with the content item are satisfied by a user of an online system. In this example, the online system may include the content item among additional content items that are eligible to be presented to the user in a content selection process that selects one or more of the content items for presentation to the user (e.g., based on predicted affinities of the user for the content items, bid amounts, or other values associated with the content items).

When predicting likelihoods that online system users will perform types of conversions associated with content items, online systems may have to account for different paths of events leading to the types of conversions that the users potentially may follow when presented with the content items. For example, suppose that a type of conversion associated with a content item corresponds to installing an application associated with the content item. In this example, to predict a likelihood that an online system user will install the application, an online system may evaluate a first path of events leading to installing the application that includes an impression of the content item, followed by a click on the content item, followed by an installation of the application. In the above example, the online system also may evaluate a second path of events leading to installing the application that includes only an impression of the content item, followed by an installation of the application.

However, it may be difficult to evaluate the paths of events leading to different types of conversions associated with various content items in an accurate and comprehensive manner. Since every content item is unique, a type of conversion associated with each content item may be associated with different paths of events, making it difficult and time-consuming to accurately determine the paths of events leading to types of conversions associated with different content items. By failing to take into account all of the paths of events that online system users may follow to perform types of conversions associated with content items, online systems also may fail to maximize the number of conversions performed by the users.

SUMMARY

An online system accounts for different paths of events that online system users may follow to perform types of conversions associated with content items when selecting content for presentation to the users. The online system does so by obtaining composite predictions associated with content items, in which each composite prediction indicates a likelihood that a viewing user of the online system will perform a type of conversion associated with a content item via one or more paths of events leading to the type of conversion. To obtain a composite prediction associated with a content item, the online system receives information describing one or more paths of events leading to a type of conversion associated with the content item and a set of parameters associated with the content item and evaluates the path(s) of events based on a tree data structure maintained in the online system. The tree data structure may be included among multiple tree data structures maintained in the online system, in which each tree data structure corresponds to a different type of conversion and describes one or more paths of events leading to the type of conversion with which it is associated. A tree data structure may include various types of nodes that are associated with constant values, raw predictions, and types of operations.

Upon identifying an opportunity to present content to a viewing user of the online system, the online system may identify a tree data structure corresponding to each of a set of candidate content items eligible for presentation to the viewing user. To obtain a composite prediction associated with a candidate content item, the online system may evaluate and perform operations associated with nodes of a tree data structure corresponding to a type of conversion associated with the candidate content item while traversing the nodes. The online system may traverse nodes of a tree data structure in a particular order (e.g., in-order, pre-order, post-order, etc.). In some embodiments, the online system may calibrate values associated with nodes of a tree data structure. Once the online system has obtained a composite prediction associated with a candidate content item, the online system may determine whether to present the candidate content item to the viewing user based on the composite prediction.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
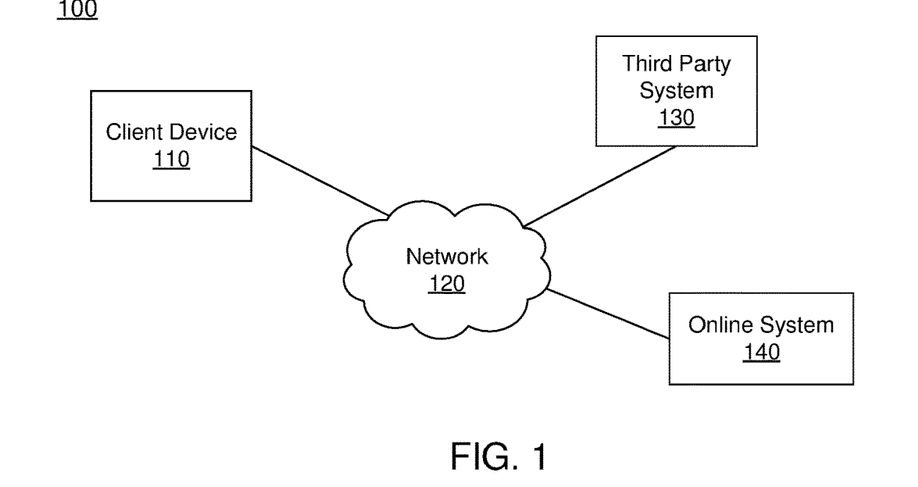
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
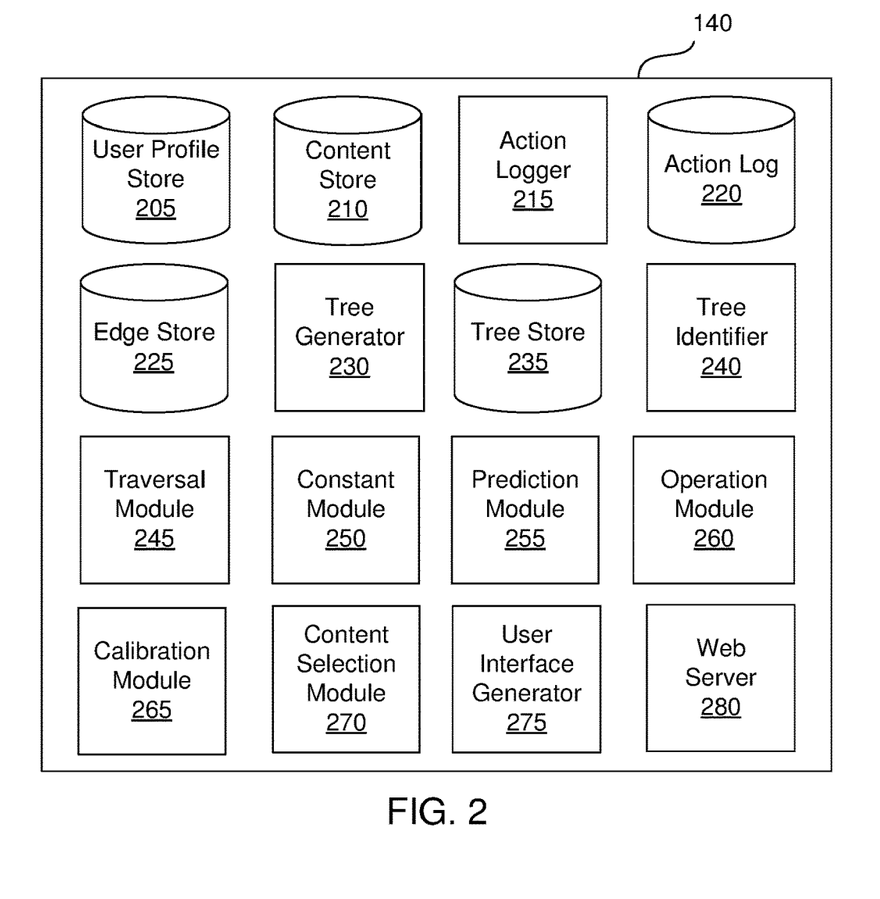
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a tree generator 230, a tree store 235, a tree identifier 240, a traversal module 245, a constant module 250, a prediction module 255, an operation module 260, a calibration module 265, a content selection module 270, a user interface generator 275, and a web server 280. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations, and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items represented by objects stored in the content store 210 include various types of content to be presented to users of the online system 140 and may be associated with bid amounts. Examples of such types of content include text, image, audio, video, or any other suitable types of data that may be presented to an online system user. In various embodiments, the content also may specify a page of content. For example, a content item includes a link to a landing page, in which the link specifies a network address of a page of content to which a user is directed when the content item is accessed. A bid amount associated with a content item may be specified by a content-providing user of the online system 140 who provided the content item to the online system 140 and is used to determine an expected value, such as monetary compensation, provided by the content-providing user to the online system 140 if content in the content item is presented to a user of the online system 140, if content in the content item receives a user interaction when presented, or if any suitable condition is satisfied when content in the content item is presented to a user of the online system 140. For example, a bid amount associated with a content item specifies a monetary amount that the online system 140 receives from a content-providing user of the online system 140 who provided the content item to the online system 140 if content in the content item is displayed. In some embodiments, an expected value to the online system 140 of presenting content included in a content item may be determined by multiplying a bid amount associated with the content item by a probability that the content included in the content item is accessed by an online system user.

In various embodiments, a content item includes various components capable of being identified and retrieved by the online system 140. Example components of a content item include: a title, text data, image data, audio data, video data, a landing page, a user associated with the content item, or any other suitable types of information. The online system 140 may retrieve one or more specific components of a content item for presentation in some embodiments. For example, the online system 140 may identify a title and an image of a content item and provide the title and the image for presentation to a user of the online system 140 rather than the content item in its entirety.

Various content items may be associated with types of conversions or objectives identifying actions that content-providing users of the online system 140 associated with the content items desire other users to perform when presented with content included in the content items. Example types of conversions/objectives include: installing an application associated with a content item, subscribing to a newsletter associated with a content item, registering for a membership associated with a content item, responding to a survey associated with a content item, purchasing a product associated with a content item, indicating a preference for a content item, sharing a content item with other users, interacting with an object associated with a content item, or performing any other suitable types of actions associated with a content item. As content from a content item is presented to online system users, the online system 140 logs interactions between users presented with the content item or with objects associated with the content item. Additionally, the online system 140 receives compensation from a content-providing user of the online system 140 associated with a content item as online system users perform interactions with the content item or objects associated with the content item that satisfy an objective associated with the content item.

Additionally, a content item may be associated with one or more targeting criteria specified by a content-providing user of the online system 140 who provided the content item to the online system 140. Targeting criteria associated with a content item specify one or more characteristics of users eligible to be presented with the content item. For example, targeting criteria are used to identify users having user profile information, edges, or actions satisfying at least one of the targeting criteria. Hence, targeting criteria allow a content-providing user of the online system 140 to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria may identify users who have taken a particular action, such as sending a message to another user, using an application, joining a group, leaving a group, joining an event, generating an event description, purchasing or reviewing a product or a service, using an online marketplace, requesting information from a third party system 130, installing an application, or performing any other suitable action. Including actions in targeting criteria allows content-providing users of the online system 140 to further refine users eligible to be presented with content items. As another example, targeting criteria may identify users having a connection to another user or object or having a particular type of connection to another user or object.

In various embodiments, the content store 210 includes objects representing content campaigns, in which each content campaign includes one or more content items. A content campaign may be associated with one or more characteristics that are attributed to each content item of the content campaign. For example, a bid amount associated with a content campaign is associated with each content item of the content campaign. Similarly, an objective associated with a content campaign is associated with each content item of the content campaign. In various embodiments, a content-providing user of the online system 140 provides various content campaigns to the online system 140, in which each content campaign includes content items having different characteristics (e.g., content items associated with different content, content items including different types of content for presentation to online system users). In such embodiments, objects representing the campaigns are stored in the content store 210.

Each object stored in the content store 210 representing a content item may be associated with a set of parameters associated with the content item. A set of parameters associated with a content item may be specified by a content-providing user of the online system 140 associated with the content item. Examples of parameters associated with a content item may include an audience size, a budget, a set of targeting criteria, a type of conversion, a quantity of the type of conversion, etc. In embodiments in which a content item is associated with a type of conversion, the content item also may be associated with a parameter corresponding to a threshold amount of time (e.g., a number of days) in which an online system user may perform the type of conversion after being presented with the content item.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

In one embodiment, the action logger 215 uses a tracking pixel or a piece of HTML code placed on third party websites that have not opted out of tracking to monitor visits to the websites by online system users. A tracking pixel might be included on various pages, including a product page describing a product, a shopping cart page that a user visits upon adding something to a shopping cart, a checkout page that a user visits to checkout and purchase a product, etc. For example, a tracking pixel results in a transparent 1×1 image, an iframe, or other suitable object being created for third party pages. When a browser loads a page having the tracking pixel, the browser attempts to retrieve the content for that pixel and contacts the online system 140 to retrieve the content. The request sent to the online system 140 includes various data about the actions performed by an online system user on the third party website. The third party website may control what data is sent to the online system 140. For example, the third party website may include information about a page an online system user is loading (e.g., information identifying the page as a product page, a shopping cart page, a checkout page, etc.), information on the page or about a product on the page that may be of interest to the user (e.g., the SKU number, the color, the size, the style, and/or the current price of the product, any discounts offered on the product, the quantity of the product being requested, etc.), information about the user (e.g., the third party's user identifier (UID) for the user, contact information for the user, etc.), and any other suitable types of data. In some embodiments, a cookie set by the online system 140 also may be retrieved by the online system 140, which may include various types of data about an online system user, such as the online systems' UID for the user, information about the client device 110 and the browser being used by the user, such as the Internet Protocol (IP) address of the client device 110, among other data. Tracking may also be performed on mobile applications of content-providing users of the online system 140 by using a software development kit (SDK) of the online system 140 or via an application programming interface (API) of the online system 140 that tracks events (e.g., purchases) associated with online system users occurring on a content-providing user's application and reports them to the online system 140.

The online system 140 may use data received about an online system user to serve better content to the user in the future (e.g., since the online system 140 has additional data about products purchased or browsed by the user that might be of interest to the user). The online system 140 also may use this data to retarget content to the user (e.g., if the user accessed a product page on a third party website by clicking on a content item associated with the third party website that was presented to the user in the online system 140). Additionally, the online system 140 may use this data to track conversions and to report results of content campaigns to a third party system 130. For example, if a third party system 130 has requested that the online system 140 present content items included in a content campaign associated with the third party system 130 to users of the online system 140, and a particular user views one of the content items on the online system 140 and then performs an action in association with being presented with the content item (possibly at some point later and/or on a different client device 110), the online system 140 may link the action to the content item originally presented by the online system 140. Thus, the online system 140 may include this data in a report to the third party system 130 describing a number of conversions the content campaign achieved.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In some embodiments, the tree generator 230 may generate a tree data structure (e.g., a binary tree) corresponding to a type of conversion associated with a content item, in which nodes and edges of the tree data structure describe one or more paths of events leading to the type of conversion. The tree generator 230 may generate the tree data structure based on information received at the online system 140 describing the paths of events. The online system 140 may receive this information from various sources. For example, the online system 140 may receive information describing paths of events leading to a type of conversion associated with a content item from a content-providing user of the online system 140 associated with the content item or from an administrator associated with the online system 140.

Different paths of events leading to a type of conversion associated with a content item may represent different combinations of conditional probabilities that collectively represent a joint probability that a viewing user of the online system 140 will perform the type of conversion associated with the content item. For example, a probability that a viewing user of the online system 140 will purchase a product associated with a content item within seven days of being presented with the content item and will click on the content item, given an impression of the content item may be represented as P(conv_7d, click | imp). In this example, the probability also may be represented as: P(imp→click→conv_7d) or as: P(imp)*P(click | imp)*P(conv_7d | click | imp).

Once the tree generator 230 has generated a tree data structure, the tree data structure may be stored in the tree store 235 (described below). In various embodiments, tree data structures are dynamic and may be modified by the tree generator 230. For example, nodes of a tree data structure may be modified in response to receiving information describing a change to a path of events leading to a type of conversion corresponding to the tree data structure, such that one or more nodes may be added, deleted, or changed (e.g., to a different type of node). The functionality of the tree generator 230 is further described below in conjunction with FIG. 3.

The tree store 235 maintains (e.g., as shown in step 310 of FIG. 3) one or more tree data structures, in which each tree data structure corresponds to a type of conversion that may be associated with a content item. In some embodiments, a type of conversion corresponding to a tree data structure may be identified based on a root node of the tree data structure. For example, a root node of a tree data structure maintained in the tree store 235 may correspond to making purchases associated with content items within one day of being presented with the content items, a root node of another tree data structure maintained in the tree store 235 may correspond to purchasing products associated with content items within two days of being presented with the content items, etc.

Each tree data structure maintained in the tree store 235 may include various types of nodes. A tree data structure may include one or more "constant nodes," each of which is associated with a constant value that is returned when the constant node is evaluated by the constant module 250 (described below). A tree data structure also may include one or more "prediction nodes," each of which is associated with a raw prediction that is obtained when the prediction node is evaluated by the prediction module 255 (described below). In some embodiments, leaf nodes included in one or more tree data structures maintained in the tree store 235 correspond only to constant nodes and/or prediction nodes. A tree data structure also may include a set of "composition nodes," each of which is associated with a type of operation (e.g., addition, subtraction, multiplication, etc.) that may be performed on a set of values by the operation module 260 (described below) to obtain a "composition result" that also is associated with the composition node. Each value (e.g., a constant value, a raw prediction, or a composition result) on which an operation associated with a composition node is performed is associated with a node within the same tree data structure. In some embodiments, one or more prediction nodes and/or composition nodes of a tree data structure also may be "calibration nodes." In such embodiments, the calibration module 265 (described below) may calibrate values associated with the calibration nodes (i.e., raw predictions and/or composition results). The tree store 235 is further described below in conjunction with FIGS. 3 and 4.

The tree identifier 240 identifies (e.g., as shown in step 335 of FIG. 3) a tree data structure maintained in the tree store 235 corresponding to a type of conversion associated with a content item. In some embodiments, the tree identifier 240 may identify a tree data structure corresponding to each of a set of candidate content items eligible for presentation to a viewing user of the online system 140. For example, upon identifying an opportunity to present content to a viewing user of the online system 140, the content selection module 270 (described below) may retrieve a set of candidate content items eligible to be presented to the viewing user. In this example, for each candidate content item identified by the content selection module 270, the tree identifier 240 may access the tree store 235 and identify a tree data structure corresponding to a type of conversion associated with the candidate content item. The functionality of the tree identifier 240 is further described below in conjunction with FIG. 3.

The traversal module 245 traverses nodes of a tree data structure to obtain a composite prediction associated with a content item, in which the content item is associated with a type of conversion corresponding to the tree data structure. A composite prediction associated with a content item indicates a likelihood that a viewing user of the online system 140 will perform a type of conversion associated with the content item. For example, a composite prediction associated with a content item may indicate a likelihood that a viewing user of the online system 140 will subscribe to a newsletter associated with the content item, purchase a product associated with the content item within a threshold amount of time of being presented with the content item, etc.

The traversal module 245 may traverse nodes of a tree data structure in a particular order (e.g., in-order, pre-order, post-order, etc.). In embodiments in which leaf nodes of a tree data structure correspond only to constant nodes and/or prediction nodes, the traversal module 245 may traverse the nodes in a post-order manner. For example, suppose that leaf nodes of a tree data structure correspond only to constant nodes and prediction nodes. In this example, the traversal module 245 may traverse the nodes from left to right, from the leaf nodes to the root node, such that the constant nodes and prediction nodes are evaluated by the constant module 250 and the prediction module 255 (described below) before the operation module 260 (described below) performs operations associated with composition nodes. In embodiments in which the traversal module 245 traverses the nodes of a tree data structure in a post-order manner, a composite prediction associated with a content item is obtained upon performing an operation associated with a root node of the tree data structure. The functionality of the traversal module 245 is further described below in conjunction with FIGS. 3 and 4.

The constant module 250 may evaluate (e.g., as shown in step 340 of FIG. 3) constant nodes of tree data structures. The constant module 250 may evaluate a constant node when the traversal module 245 reaches the constant node. As described above, a constant value that is returned when the constant module 250 evaluates a constant node is associated with the constant node. For example, if a particular constant node always returns a value of 1 when evaluated by the constant module 250, the value of 1 becomes associated with the constant node. The functionality of the constant module 250 is further described below in conjunction with FIGS. 3 and 4.

The prediction module 255 evaluates (e.g., as shown in step 345 of FIG. 3) prediction nodes of tree data structures. The prediction module 255 may evaluate a prediction node when the traversal module 245 reaches the prediction node. As described above, a raw prediction that is returned when the prediction module 255 evaluates a prediction node is associated with the prediction node. A raw prediction associated with a prediction node indicates a likelihood of an event included among a path of events leading to a type of conversion associated with a content item (e.g., a likelihood that a viewing user of the online system 140 will click on a content item, given that the content item is presented to the viewing user). Each raw prediction may be made based on a set of parameters associated with a content item (e.g., a budget, a set of targeting criteria, etc.) and a set of user attributes associated with a viewing user of the online system 140 (e.g., demographic information, information describing actions performed by the viewing user, and/or connections established between the viewing user and other online system users). In some embodiments, a raw prediction associated with a prediction node may be obtained using a machine-learning model that is associated with the prediction node. The functionality of the prediction module 255 is further described below in conjunction with FIGS. 3 and 4.

The operation module 260 performs (e.g., as shown in step 355 of FIG. 3) types of operations corresponding to composition nodes of tree data structures. The operation module 260 may perform a type of operation corresponding to a composition node when the traversal module 245 reaches the composition node. As described above, a composition result that is returned when the operation module 260 performs a type of operation corresponding to a composition node is associated with the composition node. For example, if the operation module 260 performs a multiplication operation associated with a composition node on a set of values, a composition result associated with the composition node is a product of the values.

In some embodiments, a set of values on which an operation associated with a composition node is performed is associated with a set of child nodes of the composition node. For example, if a tree data structure is a binary tree, in which each composition node is a parent node of a pair of child nodes, the operation module 260 may perform a type of binary operation associated with each composition node on values associated with its child nodes (e.g., in order from left to right). As an additional example, if a first composition node is a child node of a second composition node, the operation module 260 may perform a type of operation associated with the first composition node to obtain a first composition result. In this example, the operation module 260 may then perform a type of operation associated with the second composition node on the first composition result and a set of additional values associated with a set of additional child nodes of the second composition node to obtain a second composition result. The functionality of the operation module 260 is further described below in conjunction with FIGS. 3 and 4.

The calibration module 265 may divide (e.g., as shown in step 315 of FIG. 3) users of the online system 140 into different segments of online system users based on various user attributes associated with the users, such that users associated with similar user attributes are included in the same segment. For example, the calibration module 265 may divide online system users into different segments based on their ages and geographic locations. In this example, users belonging to the same age group and who are located in the same geographic region are included in the same segment.

The calibration module 265 also may compute (e.g., as shown in step 320 of FIG. 3) a calibration value associated with each of multiple segments of online system users. The calibration module 265 may compute a calibration value associated with a segment of online system users based on one or more actual values corresponding to one or more raw predictions or one or more composite results associated with a prediction node or a composition node, respectively. For example, a calibration value may correspond to a ratio of an average rate at which online system users belonging to a segment clicked on content items, given that the content items were presented to the users to an average of the predicted likelihoods that the users would click on the content items, given that the content items were presented to the users.

The calibration module 265 may calibrate (e.g., as shown in steps 350 and 355 of FIG. 3) raw predictions associated with prediction nodes and/or composition results associated with composition nodes, in which the prediction nodes and composition nodes also are calibration nodes. To calibrate a value associated with a calibration node (i.e., a raw prediction or a composition result) the calibration module 265 may determine a segment to which an online system user belongs (e.g., based on a set of user attributes associated with the user). The calibration module 265 may then calibrate the value based on a calibration value associated with the segment (e.g., by computing a product of a raw prediction and a calibration value or a product of a composition result and a calibration value). The calibrated value may then become associated with the calibration node and used to obtain a composite prediction associated with a content item. In various embodiments, the calibration module 265 may calibrate raw predictions associated with prediction nodes that also are calibration nodes if the raw predictions are obtained using machine-learning models that are not trained based on user attributes associated with online system users. The functionality of the calibration module 265 is further described below in conjunction with FIGS. 3 and 4.

The content selection module 270 may identify (e.g., as shown in step 330 of FIG. 3) one or more candidate content items eligible for presentation to a viewing user of the online system 140. Candidate content items eligible for presentation to the viewing user are retrieved from the content store 210 or from another source by the content selection module 270, which also determines (e.g., as shown in step 360 of FIG. 3) whether to present the candidate content items to the viewing user (e.g., by ranking the candidate content items and selecting one or more of the candidate content items for presentation to the viewing user). A candidate content item eligible for presentation to a viewing user is a content item associated with at least a threshold number of targeting criteria satisfied by characteristics of the viewing user or is a content item that is not associated with targeting criteria. In various embodiments, the content selection module 270 includes candidate content items eligible for presentation to a viewing user in one or more content selection processes, which identify a set of content items for presentation to the viewing user. For example, the content selection module 270 determines measures of relevance of various candidate content items to a viewing user based on characteristics associated with the viewing user by the online system 140 and based on the viewing user's affinity for different candidate content items. Based on the measures of relevance, the content selection module 270 selects content items for presentation to the viewing user. As an additional example, the content selection module 270 selects content items having the highest measures of relevance or having at least a threshold measure of relevance for presentation to a viewing user. Alternatively, the content selection module 270 ranks candidate content items based on their associated measures of relevance and selects content items having the highest positions in the ranking or having at least a threshold position in the ranking for presentation to a viewing user.

In some embodiments, the content selection module 270 selects one or more content items for presentation to a viewing user of the online system 140 based on a composite prediction associated with each content item indicating a likelihood that the viewing user will perform a type of conversion associated with the content item. For example, suppose that the content selection module 270 has identified multiple candidate content items eligible for presentation to a viewing user of the online system 140 and that a composite prediction indicating a likelihood that the viewing user will perform a type of conversion associated with each candidate content item has been obtained. In this example, the content selection module 270 may rank the candidate content items based on the composite predictions (e.g., from highest to lowest likelihood) and select one or more content items based on the ranking (e.g., the highest ranked candidate content item(s)).

Content items selected for presentation to a viewing user may be associated with bid amounts. The content selection module 270 may use the bid amounts associated with candidate content items when selecting content for presentation to the viewing user. In the above example, the content selection module 270 may determine a bid amount associated with each candidate content item based on the composite prediction, rank the candidate content items based on the bid amounts, and select one or more of the content items for presentation to the viewing user based on the ranking. In various embodiments, the content selection module 270 determines an expected value associated with various candidate content items based on their bid amounts and selects content items associated with a maximum expected value or associated with at least a threshold expected value for presentation to a viewing user. An expected value associated with a candidate content item represents an expected amount of compensation to the online system 140 for presenting the candidate content item. For example, the expected value associated with a candidate content item is a product of the candidate content item's bid amount and a likelihood of a viewing user interacting with content from the candidate content item. The content selection module 270 may rank candidate content items based on their associated bid amounts and select content items having at least a threshold position in the ranking for presentation to a viewing user. In some embodiments, the content selection module 270 ranks both candidate content items not associated with bid amounts and candidate content items associated with bid amounts in a unified ranking based on bid amounts and measures of relevance associated with the candidate content items. Based on the unified ranking, the content selection module 270 selects content for presentation to the viewing user. Selecting content items through a unified ranking is further described in U.S. patent application Ser. No. 13/545,266, filed on Jul. 10, 2012 (U.S. Publication No. US2014/0019261 A1, published on Jan. 16, 2014), which is hereby incorporated by reference in its entirety.

For example, the content selection module 270 receives a request to present a feed of content to a viewing user of the online system 140. The feed may include one or more advertisements as well as other content items, such as stories describing actions associated with other online system users connected to the viewing user. The content selection module 270 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 270 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 270 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the content selection module 270 presents content to a viewing user through a newsfeed including a plurality of content items selected for presentation to the viewing user. One or more advertisements also may be included in the feed. The content selection module 270 may also determine the order in which selected content items are presented via the feed. For example, the content selection module 270 orders content items in a feed based on likelihoods of a viewing user interacting with various content items. The functionality of the content selection module 270 is further described below in conjunction with FIG. 3.

Once the content selection module 270 has selected one or more content items for presentation to a viewing user of the online system 140, the user interface generator 275 may generate a user interface including the content item(s). For example, the user interface generator 275 may generate a feed of content items (e.g., a newsfeed) that includes one or more content items selected by the content selection module 270, which the online system 140 sends (e.g., as shown in step 365 of FIG. 3) for display to a viewing user of the online system 140. As an additional example, the user interface generator 275 may generate a display unit including a content item that is presented along the right side of a display area of a client device 110 associated with a viewing user of the online system 140. The functionality of the user interface generator 275 is further described below in conjunction with FIG. 3.

The web server 280 links the online system 140 via the network 120 to the one or more client devices 110, as well as to the one or more third party systems 130. The web server 280 serves web pages, as well as other content, such as JAVA®, FLASH®, XML and so forth. The web server 280 may receive and route messages between the online system 140 and the client device 110, for example, instant messages, queued messages (e.g., email), text messages, short message service (SMS) messages, or messages sent using any other suitable messaging technique. A user may send a request to the web server 280 to upload information (e.g., images or videos) that are stored in the content store 210. Additionally, the web server 280 may provide application programming interface (API) functionality to send data directly to native client device operating systems, such as IOS®, ANDROID™, or BlackberryOS.

Figure 3:
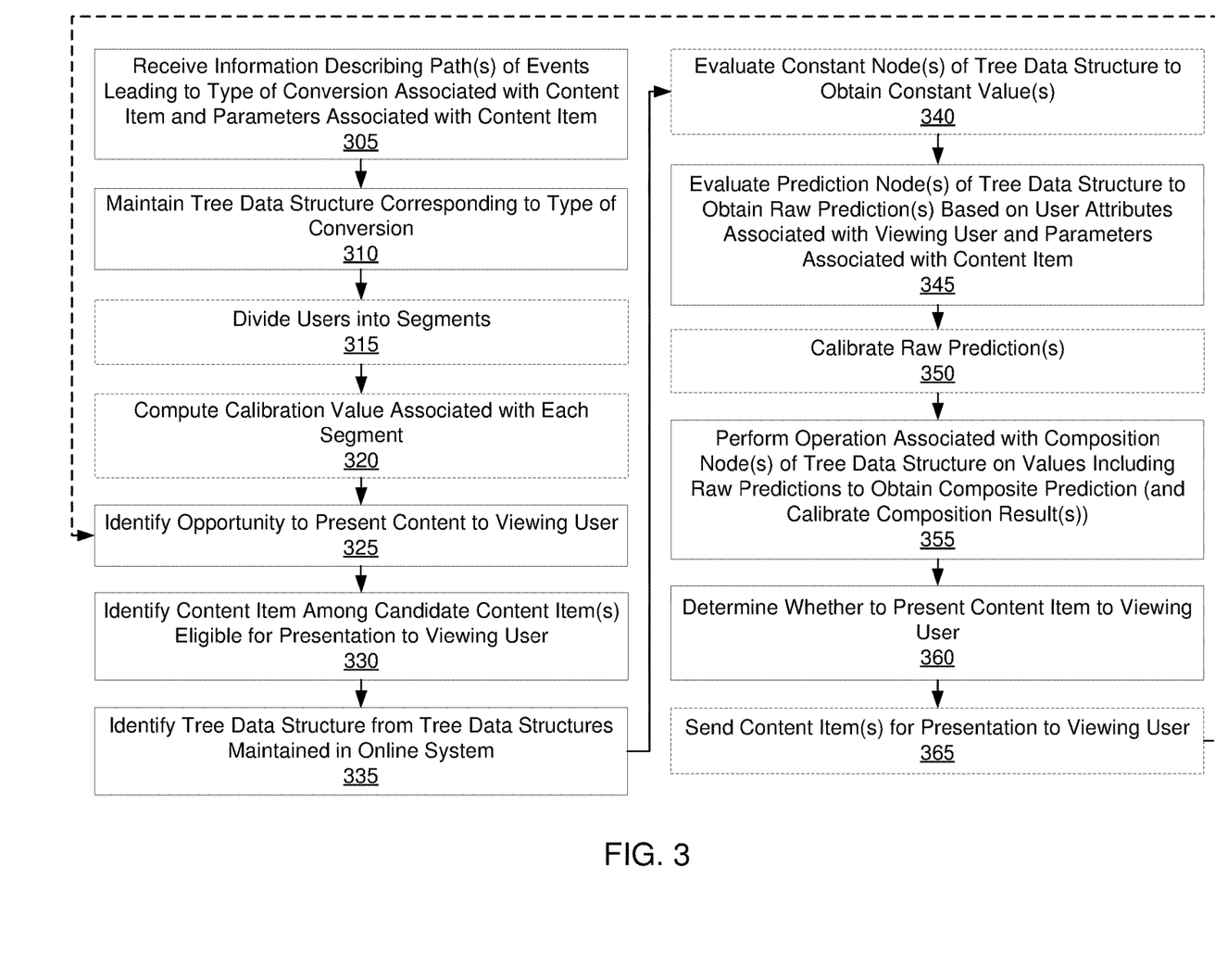
FIG. 3 is a flow chart of a method for obtaining a composite prediction indicating a likelihood that a user of an online system will perform a type of conversion associated with a content item via one or more paths of events, in accordance with an embodiment.

FIG. 3 is a flow chart of a method for obtaining a composite prediction indicating a likelihood that a user of an online system will perform a type of conversion associated with a content item via one or more paths of events. In other embodiments, the method may include different and/or additional steps than those shown in FIG. 3. Additionally, steps of the method may be performed in a different order than the order described in conjunction with FIG. 3.

The online system 140 receives 305 information describing one or more paths of events leading to a type of conversion associated with a content item (e.g., installing an application associated with the content item, subscribing to a newsletter associated with the content item, etc.) and a set of parameters associated with the content item (e.g., an audience size, a budget, a set of targeting criteria, etc.). The online system 140 may receive 305 the information from various sources (e.g., from a content-providing user of the online system 140 associated with the content item or from an administrator associated with the online system 140). As described above, different paths of events leading to the type of conversion associated with the content item may represent different combinations of conditional probabilities that collectively represent a joint probability that a viewing user of the online system 140 will perform the type of conversion associated with the content item.

A tree data structure corresponding to the type of conversion associated with the content item is maintained 310 in the online system 140 (e.g., in the tree store 235), in which nodes and edges of the tree data structure describe the path(s) of events. In various embodiments, the tree data structure is generated by the online system 140 (e.g., using the tree generator 230). The tree data structure may be maintained 310 in the online system 140 among additional tree data structures corresponding to other types of conversions. As described above, a type of conversion corresponding to a tree data structure may be identified based on its root node. In some embodiments, one or more tree data structures maintained 310 in the online system 140 are dynamic and may be modified.

Figure 4:
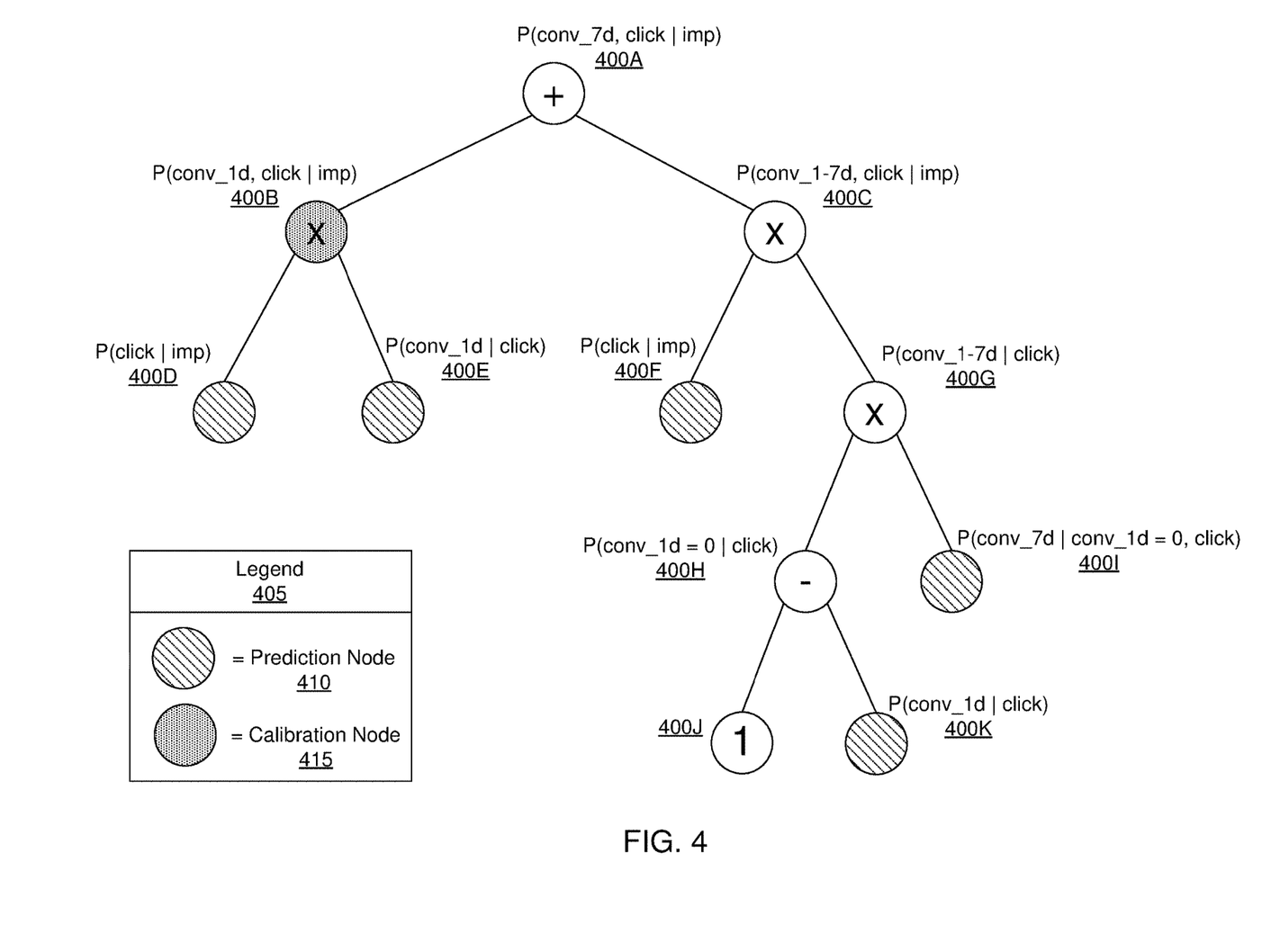
FIG. 4 is an example of a tree data structure describing one or more paths of events leading to a type of conversion, in accordance with an embodiment.

As described above, each tree data structure maintained 310 in the online system 140 may include various types of nodes (i.e., constant nodes, prediction nodes, composition nodes, and calibration nodes). FIG. 4 illustrates examples of these nodes in a tree data structure. In this example, node 400J corresponds to a constant node that is associated with a constant value of 1 that is returned when evaluated by the online system 140 (e.g., using the constant module 250). As shown in the legend 405, nodes 400D-F, 400I, and 400K correspond to prediction nodes 410, each of which is associated with a raw prediction that is obtained when the prediction node is evaluated by the online system 140 (e.g., using the prediction module 255). Nodes 400A-C and 400G-H correspond to composition nodes, each of which is associated with a type of operation that may be performed on a set of values by the online system 140 (e.g., using the operation module 260) to obtain a composition result that also is associated with the composition node. More specifically, node 400A is associated with an addition operation (indicated by "+"), nodes 400B-C and 400G are associated with a multiplication operation (indicated by "x"), and node 400H is associated with a subtraction operation (indicated by "–"). Each value (e.g., a constant value, a raw prediction, or a composition result) on which an operation associated with a composition node 400A-C, 400G-H is performed is associated with a node 400 within the same tree data structure. As indicated in the legend 405, since node 400B is a calibration node 415, the online system 140 may calibrate the composition result associated with node 400B (e.g., using the calibration module 265).

Referring back to FIG. 3, in some embodiments, the online system 140 may divide 315 (e.g., using the calibration module 265) users of the online system 140 into different segments of online system users based on various user attributes associated with the users, such that users associated with similar user attributes are included in the same segment. In such embodiments, the online system 140 also may compute 320 (e.g., using the calibration module 265) a calibration value associated with each segment of online system users. The online system 140 may compute 320 a calibration value associated with a segment of online system users based on one or more actual values corresponding to one or more raw predictions or one or more composite results associated with a prediction node or a composition node, respectively.

Upon identifying 325 an opportunity to present content to a viewing user of the online system 140, the online system 140 identifies 330 (e.g., using the content selection module 270) one or more candidate content items eligible for presentation to the viewing user, in which the content item is included among the candidate content item(s). The online system 140 then identifies 335 (e.g., using the tree identifier 240) a tree data structure maintained 310 in the online system 140 (e.g., in the tree store 235) corresponding to the type of conversion associated with each candidate content item (e.g., based on a root node of each tree data structure corresponding to the type of conversion associated with each candidate content item).

The online system 140 then traverses (e.g., using the traversal module 245) nodes of each identified tree data structure corresponding to a type of conversion associated with a candidate content item to obtain a composite prediction associated with the candidate content item. A composite prediction associated with a candidate content item indicates a likelihood that the viewing user will perform the type of conversion associated with the content item. As described above, the online system 140 may traverse nodes of a tree data structure in a particular order (e.g., in-order, pre-order, post-order, etc.).

As the online system 140 traverses the nodes of each tree data structure, the online system 140 may evaluate 340 (e.g., using the constant module 250) a set of constant nodes of each tree data structure. The online system 140 also evaluates 345 (e.g., using the prediction module 255) a set of prediction nodes of each tree data structure to obtain a raw prediction associated with each prediction node that indicates a likelihood of an event included among a path of events leading to a type of conversion associated with each candidate content item. Each raw prediction may be made based on a set of parameters associated with a candidate content item and a set of user attributes associated with the viewing user. As described above, in some embodiments, a raw prediction associated with a prediction node may be obtained using a machine-learning model that is associated with the prediction node.

In some embodiments, the online system 140 may calibrate (in step 350, e.g., using the calibration module 265) raw predictions associated with prediction nodes that also are calibration nodes. In such embodiments, each calibrated raw prediction may then become associated with a prediction node and used to obtain a composite prediction associated with a candidate content item. As described above, in various embodiments, the online system 140 may calibrate 350 a raw prediction associated with a prediction node that is also a calibration node if the raw prediction is obtained using a machine-learning model that is not trained based on user attributes associated with online system users.

As the online system 140 traverses the nodes of each tree data structure, the online system 140 also performs 355 (e.g., using the operation module 260) types of operations corresponding to composition nodes of the tree data structure. The online system 140 may perform 355 a type of operation corresponding to a composition node to obtain a composition result that is associated with the composition node. In some embodiments, the online system 140 may calibrate (in step 355, e.g., using the calibration module 265) composition results associated with composition nodes that also are calibration nodes. In such embodiments, each calibrated composition result may then become associated with a composition node and used to obtain a composite prediction associated with a candidate content item.

In some embodiments, a set of values on which an operation associated with a composition node is performed 355 is associated with a set of child nodes of the composition node. As shown in the example of FIG. 4, if a tree data structure is a binary tree, in which a composition node (e.g., node 400A) is a parent node of a pair of child nodes (e.g., nodes 400B-C), the online system 140 may perform 355 a type of binary operation associated with the composition node on values associated with its child nodes. As also shown in the example of FIG. 4, if a first composition node (e.g., node 400B) is a child node of a second composition node (e.g., node 400A), the online system 140 may perform 355 a type of operation associated with the first composition node to obtain a first composition result. In this example, the online system 140 may then perform 355 a type of operation associated with the second composition node on the first composition result and a set of additional values associated with a set of additional child nodes (e.g., node 400C) of the second composition node to obtain a second composition result.

In embodiments in which leaf nodes of a tree data structure correspond only to constant nodes and prediction nodes, the online system 140 may perform steps 340 through 355 while traversing the nodes in a post-order manner. For example, referring still to FIG. 4, in which the leaf nodes of the tree data structure (nodes 400D-F and 400I-K) correspond only to a constant node and prediction nodes 410, the online system 140 may traverse the nodes from left to right, from the leaf nodes to the root node. In this example, by traversing the nodes in a post-order manner, the online system 140 evaluates 340, 345 the constant node (node 400J) and the prediction nodes (nodes 400D-F and 400I-K) before performing (in step 355) operations associated with the composition nodes (nodes 400A-C and 400G-H). In embodiments in which the online system 140 traverses the nodes of a tree data structure in a post-order manner, a composite prediction associated with a candidate content item is obtained upon performing 355 an operation associated with a root node of the tree data structure. Continuing with the above example, a composite prediction associated with a candidate content item is obtained upon performing 355 an addition operation associated with the root node 400A.

Referring once more to FIG. 3, the online system 140 then determines 360 (e.g., using the content selection module 270) whether to present each candidate content item to the viewing user based on the composite prediction associated with the candidate content item. In embodiments in which the online system 140 identifies 330 multiple candidate content items eligible for presentation to the viewing user, the online system 140 may rank (e.g., using the content selection module 270) the candidate content items based on the composite predictions. Alternatively, in the above example, the online system 140 may compute a bid amount associated with each candidate content item based on its associated composite prediction and rank the candidate content items based on the bid amounts. The online system 140 may then select (e.g., using the content selection module 270) one or more of the candidate content items for presentation to the viewing user based on the ranking.

The online system 140 may then generate (e.g., using the user interface generator 275) a user interface including the selected content item(s) and send 365 the user interface for display to the viewing user. In some embodiments, the online system 140 may repeat some of the steps described above (e.g., by proceeding back to the identifying 325 an opportunity to present content to the viewing user step).

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for predicting a likelihood that a viewing user of an online system will perform a type of conversion, the method comprising:

receiving, at the online system, information describing one or more paths of events leading to the type of conversion associated with a content item and a set of parameters associated with the content item;

maintaining, in a database of the online system, a tree data structure corresponding to the type of conversion that describes the one or more paths of events, wherein each of a first set of nodes comprising the tree data structure is associated with a raw prediction indicating a likelihood of an event included among the one or more paths of events, the raw prediction obtained using a machine-learning model, and each of a second set of nodes comprising the tree data structure is associated with a type of operation;

identifying, by the online system, an opportunity to present content to the viewing user of the online system;

identifying, from the database of the online system, a set of candidate content items eligible for presentation to the viewing user based at least in part on a set of user attributes associated with the viewing user, wherein the set of candidate content items comprises the content item;

identifying, by the online system, the tree data structure corresponding to the type of conversion from a plurality of tree data structures maintained in the online system based at least in part on the type of conversion associated with the content item;

evaluating, by the online system, each of the first set of nodes to obtain a set of raw predictions, each of the first set of nodes evaluated based at least in part on the set of user attributes associated with the viewing user and the set of parameters associated with the content item;

performing, by the online system, the type of operation associated with each of the second set of nodes on a set of values comprising the set of raw predictions to obtain a composite prediction indicating a likelihood that the viewing user will perform the type of conversion, wherein each of the set of values is associated with a node comprising the tree data structure;

determining, by the online system, to present the content item to the viewing user based at least in part on the composite prediction, and presenting the content item to the viewing user through a user interface generated by the online system.

2. The method of claim 1, wherein the composite prediction indicates the likelihood that the viewing user will perform the type of conversion within a threshold amount of time of being presented with the content item.

3. The method of claim 1, further comprising:
evaluating each of a third set of nodes to obtain a set of constant values, the set of constant values included among the set of values on which the type of operation associated with each of the second set of nodes is performed.

4. The method of claim 3, wherein one or more leaf nodes comprising the tree data structure correspond to one or more of the first set of nodes and the third set of nodes.

5. The method of claim 1, wherein the tree data structure is a binary tree, each of the second set of nodes corresponds to a parent node of a pair of child nodes, the type of operation associated with each of the second set of nodes is a binary operation that is performed on a pair of values associated with the pair of child nodes, and a plurality of nodes comprising the tree data structure is traversed in a post-order manner.

6. The method of claim 1, wherein the set of values further comprises a set of composition results, each of the set of composition results obtained by performing the type of operation associated with each of the second set of nodes on a subset of the set of values.

7. The method of claim 6, further comprising:
calibrating one or more selected from the group consisting of: one or more of the set of raw predictions and one or more of the set of composition results.

8. The method of claim 1, wherein the event included among the one or more paths of events is selected from the group consisting of: an impression of the content item and a click on the content item.

9. The method of claim 1, wherein each of the one or more paths of events represent one or more conditional probabilities that collectively represent a joint probability that the viewing user will perform the type of conversion.

10. A computer program product comprising a computer readable storage medium having instructions for predicting a likelihood that a viewing user of an online system will perform a type of conversion, the instructions encoded on the computer readable storage medium and, when executed by a processor, causing the processor to:
receive, at the online system, information describing one or more paths of events leading to the type of conversion associated with a content item and a set of parameters associated with the content item;
maintain, in a database of the online system, a tree data structure corresponding to the type of conversion that describes the one or more paths of events, wherein each of a first set of nodes comprising the tree data structure is associated with a raw prediction indicating a likelihood of an event included among the one or more paths of events, the raw prediction obtained using a machine-learning model, and each of a second set of nodes comprising the tree data structure is associated with a type of operation;
identify, by the online system, an opportunity to present content to the viewing user of the online system;
identify, from the database of the online system, a set of candidate content items eligible for presentation to the viewing user based at least in part on a set of user attributes associated with the viewing user, wherein the set of candidate content items comprises the content item;
identify, by the online system, the tree data structure corresponding to the type of conversion from a plurality of tree data structures maintained in the online system based at least in part on the type of conversion associated with the content item;
evaluate, by the online system, each of the first set of nodes to obtain a set of raw predictions, each of the first set of nodes evaluated based at least in part on the set of user attributes associated with the viewing user and the set of parameters associated with the content item;
perform, by the online system, the type of operation associated with each of the second set of nodes on a set of values comprising the set of raw predictions to obtain a composite prediction indicating a likelihood that the viewing user will perform the type of conversion, wherein each of the set of values is associated with a node comprising the tree data structure;
determine, by the online system, to present the content item to the viewing user based at least in part on the composite prediction; and
present the content item to the viewing user through a user interface generated by the online system.

11. The computer program product of claim 10, wherein the composite prediction indicates the likelihood that the viewing user will perform the type of conversion within a threshold amount of time of being presented with the content item.

12. The computer program product of claim 10, wherein the computer readable storage medium further has instructions encoded thereon that, when executed by the processor, cause the processor to:
evaluate each of a third set of nodes to obtain a set of constant values, the set of constant values included among the set of values on which the type of operation associated with each of the second set of nodes is performed.

13. The computer program product of claim 12, wherein one or more leaf nodes comprising the tree data structure correspond to one or more of the first set of nodes and the third set of nodes.

14. The computer program product of claim 10, wherein the tree data structure is a binary tree, each of the second set of nodes corresponds to a parent node of a pair of child nodes, the type of operation associated with each of the second set of nodes is a binary operation that is performed on a pair of values associated with the pair of child nodes, and a plurality of nodes comprising the tree data structure is traversed in a post-order manner.

15. The computer program product of claim 10, wherein the set of values further comprises a set of composition results, each of the set of composition results obtained by performing the type of operation associated with each of the second set of nodes on a subset of the set of values.

16. The computer program product of claim 15, wherein the computer readable storage medium further has instructions encoded thereon that, when executed by the processor, cause the processor to:
calibrate one or more selected from the group consisting of: one or more of the set of raw predictions and one or more of the set of composition results.

17. The computer program product of claim 10, wherein the event included among the one or more paths of events is selected from the group consisting of: an impression of the content item and a click on the content item.

18. The computer program product of claim 10, wherein each of the one or more paths of events represent one or more conditional probabilities that collectively represent a joint probability that the viewing user will perform the type of conversion.

* * * * *

UNITED STATES PATENT AND TRADEMARK OFFICE
CERTIFICATE OF CORRECTION

| | |
|---|---|
| PATENT NO. | : 10,909,569 B1 |
| APPLICATION NO. | : 16/214114 |
| DATED | : February 2, 2021 |
| INVENTOR(S) | : Shah et al. |

It is certified that error appears in the above-identified patent and that said Letters Patent is hereby corrected as shown below:

In the Claims

Column 20, Line 63, Claim 1, delete "composite prediction" and insert -- composite prediction; --.

Signed and Sealed this
Seventh Day of February, 2023

Katherine Kelly Vidal
*Director of the United States Patent and Trademark Office*